(12) United States Patent
Higgins

(10) Patent No.: US 7,598,961 B2
(45) Date of Patent: Oct. 6, 2009

(54) METHOD AND APPARATUS FOR CONVERTING FROM A SOURCE COLOR SPACE TO A TARGET COLOR SPACE

(75) Inventor: Michael Francis Higgins, Cazadaro, CA (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 446 days.

(21) Appl. No.: 10/691,396

(22) Filed: Oct. 21, 2003

(65) Prior Publication Data

US 2005/0083352 A1    Apr. 21, 2005

(51) Int. Cl.
    *G09G 5/02*    (2006.01)
(52) U.S. Cl. .................... 345/589; 345/590; 345/591; 345/604; 345/690
(58) Field of Classification Search ......... 345/589–591, 345/604, 690
    See application file for complete search history.

(56) References Cited

U.S. PATENT DOCUMENTS

| | | | |
|---|---|---|---|
| 4,439,759 A | 3/1984 | Fleming et al. | |
| 4,737,843 A | 4/1988 | Spencer | |
| 4,751,535 A | 6/1988 | Myers | |
| 4,946,259 A | 8/1990 | Matino et al. | |
| 4,989,079 A * | 1/1991 | Ito ............................ | 358/520 |
| 5,233,385 A | 8/1993 | Sampsell | |
| 5,311,295 A | 5/1994 | Tallman et al. | |
| 5,341,153 A | 8/1994 | Benzschawel et al. | |
| 5,398,066 A | 3/1995 | Martinez-Uriegas et al. | |
| 5,416,890 A | 5/1995 | Beretta | |
| 5,438,649 A | 8/1995 | Ruetz | |
| 5,448,652 A | 9/1995 | Vaidyanathan et al. | |
| 5,450,216 A * | 9/1995 | Kasson ...................... | 358/518 |
| 5,642,176 A | 6/1997 | Abukawa et al. | |
| 5,661,371 A | 8/1997 | Salerno et al. | |
| 5,668,890 A | 9/1997 | Winkleman | |
| 5,694,186 A * | 12/1997 | Yanagawa et al. ........... | 349/106 |
| 5,719,639 A | 2/1998 | Imamura | |
| 5,724,112 A | 3/1998 | Yoshida et al. | |
| 5,724,442 A | 3/1998 | Ogatsu et al. | |

(Continued)

FOREIGN PATENT DOCUMENTS

GB    2282928    *    4/1995

(Continued)

OTHER PUBLICATIONS

Betrisey, C., et al., Displaced Filtering for Patterned Displays, SID Symp. Digest 1999, pp. 296-299.

(Continued)

*Primary Examiner*—Kee M Tung
*Assistant Examiner*—Jwalant Amin
(74) *Attorney, Agent, or Firm*—Haynes and Boone, LLP

(57) ABSTRACT

Systems and methods are disclosed to effect a multiple mode display system that may accept multiple input image data formats and output several possible image data formats. One method is disclosed for converting from a source color space to a target color space. The source color space results from a combination of N primary color points and the target color space resulting from combination of a N+1 or more primary color points in the target color space, wherein N is an integer.

23 Claims, 5 Drawing Sheets

U.S. PATENT DOCUMENTS

| | | | |
|---|---|---|---|
| 5,731,818 A | 3/1998 | Wan et al. |
| 5,748,828 A | 5/1998 | Steiner et al. |
| 5,751,268 A | 5/1998 | Sheridon |
| 5,821,913 A | 10/1998 | Mamiya |
| 5,880,707 A | 3/1999 | Aratani |
| 5,899,550 A | 5/1999 | Masaki |
| 5,903,366 A | 5/1999 | Hirabayashi et al. |
| 5,917,556 A | 6/1999 | Katayama |
| 5,929,843 A | 7/1999 | Tanioka |
| 5,933,253 A | 8/1999 | Ito et al. |
| 5,937,089 A | 8/1999 | Kobayashi |
| 5,949,496 A | 9/1999 | Kim |
| 5,963,263 A | 10/1999 | Shyu |
| 5,987,165 A | 11/1999 | Matsuzaki et al. |
| 5,990,997 A | 11/1999 | Jones et al. |
| 5,995,669 A | 11/1999 | Shingu et al. |
| 6,005,968 A | 12/1999 | Granger |
| 6,023,527 A | 2/2000 | Narahara |
| 6,054,832 A | 4/2000 | Kunzman et al. |
| 6,097,367 A | 8/2000 | Kuriwaki et al. |
| 6,100,872 A | 8/2000 | Aratani et al. |
| 6,108,053 A | 8/2000 | Pettitt et al. |
| 6,137,560 A | 10/2000 | Utsumi et al. |
| 6,147,664 A | 11/2000 | Hansen |
| 6,147,728 A | 11/2000 | Okumura et al. |
| 6,256,425 B1 | 7/2001 | Kunzman |
| 6,262,698 B1 | 7/2001 | Blum |
| 6,262,710 B1 | 7/2001 | Smith |
| 6,278,434 B1 | 8/2001 | Hill et al. |
| 6,297,826 B1 | 10/2001 | Semba et al. |
| 6,360,008 B1 | 3/2002 | Suzuki et al. |
| 6,360,023 B1 | 3/2002 | Betrisey et al. |
| 6,384,836 B1 | 5/2002 | Naylor, Jr. et al. |
| 6,393,145 B2 | 5/2002 | Betrisey et al. |
| 6,421,142 B1 | 7/2002 | Lin et al. |
| 6,453,067 B1 | 9/2002 | Morgan et al. |
| 6,459,419 B1 | 10/2002 | Matsubayashi |
| 6,483,518 B1 | 11/2002 | Perry et al. |
| 6,536,904 B2 | 3/2003 | Kunzman |
| 6,614,414 B2 | 9/2003 | De Haan et al. |
| 6,633,302 B1 | 10/2003 | Ohsawa et al. |
| 6,707,463 B1 | 3/2004 | Gibson et al. |
| 6,714,212 B1 | 3/2004 | Tsuboyama et al. |
| 6,714,243 B1 | 3/2004 | Mathur et al. |
| 6,724,934 B1 | 4/2004 | Lee et al. |
| 6,738,526 B1 | 5/2004 | Betrisey et al. |
| 6,750,874 B1 | 6/2004 | Kim |
| 6,771,028 B1 | 8/2004 | Winters |
| 6,781,626 B1 | 8/2004 | Wang |
| 6,870,523 B1 | 3/2005 | Ben-David et al. |
| 6,885,380 B1 | 4/2005 | Primerano et al. |
| 6,897,876 B2 | 5/2005 | Murdoch et al. |
| 6,903,378 B2 | 6/2005 | Cok |
| 6,937,217 B2 | 8/2005 | Klompenhouwer et al. |
| 6,980,219 B2 | 12/2005 | Higgins |
| 7,129,955 B2 | 10/2006 | Motomura |
| 7,176,935 B2 | 2/2007 | Higgins |
| 7,184,067 B2 | 2/2007 | Miller et al. |
| 7,301,543 B2 | 11/2007 | Higgins |
| 2001/0019382 A1 | 9/2001 | Song et al. |
| 2001/0048764 A1 | 12/2001 | Betrisey et al. |
| 2002/0063670 A1 | 5/2002 | Yoshinaga et al. |
| 2002/0180688 A1 | 12/2002 | Drzaic et al. |
| 2002/0191130 A1 | 12/2002 | Liang et al. |
| 2003/0058466 A1 | 3/2003 | Hoshuyama |
| 2003/0117457 A1 | 6/2003 | Qiao |
| 2003/0128872 A1 | 7/2003 | Lee et al. |
| 2003/0151694 A1 | 8/2003 | Lee et al. |
| 2003/0179212 A1 | 9/2003 | Matsushiro et al. |
| 2003/0193056 A1 | 10/2003 | Takayama et al. |
| 2003/0214499 A1 | 11/2003 | Ohsawa et al. |
| 2004/0021804 A1 | 2/2004 | Hong et al. |
| 2004/0046725 A1 | 3/2004 | Lee |
| 2004/0072380 A1 | 4/2004 | Yamazaki et al. |
| 2004/0095521 A1 | 5/2004 | Song et al. |
| 2004/0111435 A1* | 6/2004 | Herbert et al. ........... 707/104.1 |
| 2004/0114046 A1 | 6/2004 | Lee et al. |
| 2004/0169807 A1 | 9/2004 | Rho et al. |
| 2004/0179160 A1 | 9/2004 | Rhee et al. |
| 2004/0195963 A1 | 10/2004 | Choi et al. |
| 2004/0222999 A1 | 11/2004 | Choi et al. |
| 2004/0223005 A1 | 11/2004 | Lee |
| 2004/0239813 A1 | 12/2004 | Klompenhouwer |
| 2005/0024734 A1 | 2/2005 | Richards et al. |
| 2005/0031199 A1 | 2/2005 | Ben-Chorin et al. |
| 2005/0083341 A1 | 4/2005 | Higgins et al. |
| 2005/0083344 A1 | 4/2005 | Higgins |
| 2005/0083345 A1 | 4/2005 | Higgins |
| 2005/0083352 A1 | 4/2005 | Higgins |
| 2005/0185840 A1* | 8/2005 | Sugiura et al. ............... 382/167 |
| 2005/0212728 A1 | 9/2005 | Miller et al. |
| 2005/0219274 A1 | 10/2005 | Yang et al. |
| 2005/0225561 A1 | 10/2005 | Higgins et al. |
| 2005/0225562 A1 | 10/2005 | Higgins et al. |
| 2005/0264580 A1 | 12/2005 | Higgins |
| 2006/0244686 A1 | 11/2006 | Higgins et al. |

FOREIGN PATENT DOCUMENTS

| | | |
|---|---|---|
| JP | 6-261332 | 9/1994 |
| JP | 08-202317 | 8/1996 |
| WO | WO 00/42762 | 7/2000 |
| WO | WO 01/37251 A1 | 5/2001 |
| WO | WO 2004/040548 | 5/2004 |
| WO | WO 2004/086128 A1 | 10/2004 |
| WO | WO 2005/050296 A1 | 6/2005 |
| WO | WO 2005/076257 A2 | 8/2005 |

OTHER PUBLICATIONS

Brown Elliott, C., "Active Matrix Display...", IDMC 2000, 185-189, Aug. 2000.

Brown Elliott, C., "Color Subpixel Rendering Projectors and Flat Panel Displays," SMPTE, Feb. 27-Mar. 1, 2003, Seattle, WA pp. 1-4.

Brown Elliott, C, "Co-Optimization of Color AMLCD Subpixel Architecture and Rendering Algorithms," SID 2002 Proceedings Paper, May 30, 2002 pp. 172-175.

Brown Elliott, C, "Development of the Pen Tile Matrix™ Color AMLCD Subpixel Architecture and Rendering Algorithms", SID 2003, Journal Article.

Brown Elliott, C, "New Pixel Layout for Pen Tile Matrix™ Architecture", IDMC 2002, pp. 115-117.

Brown Elliott, C, "Reducing Pixel Count Without Reducing Image Quality", Information Display Dec. 1999, vol. 1, pp. 22-25.

Credelle, Thomas, "P-00: MTF of High-Resolution Pen Tile Matrix Displays", Eurodisplay 02 Digest, 2002 pp. 1-4.

Klompenhouwer, Michiel, Subpixel Image Scaling for Color Matrix Displays, SID Symp. Digest, May 2002, pp. 176-179.

Michiel A. Klompenhouwer, Gerard de Haan, Subpixel image scaling for color matrix displays, Journal of the Society for Information Display, vol. 11, Issue 1, Mar. 2003, pp. 99-108.

Messing, Dean et al., Improved Display Resolution of Subsampled Colour Images Using Subpixel Addressing, IEEE ICIP 2002, vol. 1, pp. 625-628.

Messing, Dean et al., Subpixel Rendering on Non-Striped Colour Matrix Displays, 2003 International Conf on image Processing, Sep. 2003, Barcelona, Spain, 4 pages.

Morovic, J., Gamut Mapping, in Digital Color Imaging Handbook, ed. G. Sharma, Boca Raton, FL: CRC Press, Dec. 2002, Chapter 10, pp. 635-682.

USPTO, Notice of Allowance, dated Mar. 21, 2005 in US Patent No. 6,980,219 (U.S. Appl. No. 10/691,200).

USPTO, Non-Final Office Action dated Jun. 13, 2005 in US Patent Publication No. 2005/0083344 (U.S. Appl. No. 10/690,716).

Clairvoyante, Inc. Response to Non-Final Office Action, dated Dec. 13, 2005 in US Patent Publication No. 2005/0083344 (U.S. Appl. No. 10/690,716).

Clairvoyante, Inc., Supplemental Amendment dated Aug. 23, 2006 in US Patent Publication No. 2005/0083344 (U.S. Appl. No. 10/690,716).

USPTO, Interview Summary, dated Aug. 25, 2006 in US Patent Publication No. 2005/0083344 (U.S. Appl. No. 10/690,716).

USPTO, Interview Summary, dated Aug. 29, 2006 in US Patent Publication No. 2005/0083344 (U.S. Appl. No. 10/690,716).

Murch, M., "Visual Perception Basics," SID Seminar, 1987, Tektronix Inc, Beaverton Oregon.

PCT International Search Report dated May 21, 2007 for PCT/US04/33709 (U.S. Appl. No. 10/691,396).

PCT International Search Report dated Apr. 26, 2005 for PCT/US04/33743 (US Patent No. 7,176,935).

Wandell, Brian A., Stanford University, "Fundamentals of Vision: Behavior . . .," Jun. 12, 1994, Society for Information Display (SID) Short Course S-2, Fairmont Hotel, San Jose, California.

Werner, Ken, "OLEDS, OLEDS, Everywhere . . . ," Information Display, Sep. 2002, pp. 12-15.

USPTO, Non-Final Office Action dated Jul. 20, 2007 in US Patent Publication No. 2005/0264580 (U.S. Appl. No. 11/196,631).

Clairvoyante, Inc, Response to Non-Final Office Action dated Jan. 22, 2008 in US Patent Publication No. 2005/0264580 (U.S. Appl. No. 11/196,631).

USPTO, Non-Final Office Action dated Dec. 7, 2007 in US Patent Publication No. 2005/0083341 (U.S. Appl. No. 10/691,377).

USPTO, Notice of Allowance, dated Jul. 27, 2007 in US Patent No. 7,301,543 (U.S. Appl. No. 10/821,386).

USPTO, Non-Final Office Action dated Sep. 18, 2007 in US Patent Publication No. 2005/0225562 (U.S. Appl. No. 10/821,306).

Clairvoyante Inc., Response to Non-Final Office Action dated Mar. 17, 2008 in US Patent Publication No. 2005/0225562 (U.S. Appl. No. 10/821,306).

PCT International Search Report dated Jun. 26, 2008 for PCT/US04/33705 (U.S. Appl. No. 10/691,377).

PCT International Search Report dated May 21, 2008 for PCT/US05/09536 (U.S. Appl. No. 10/821,386).

PCT International Search Report dated Jun. 21, 2006 for PCT/US05/01002 (U.S. Appl. No. 10/821,306).

* cited by examiner

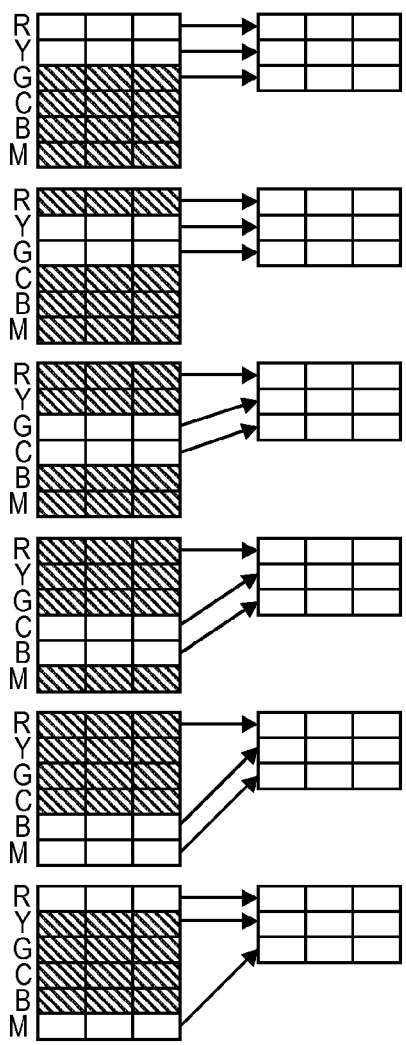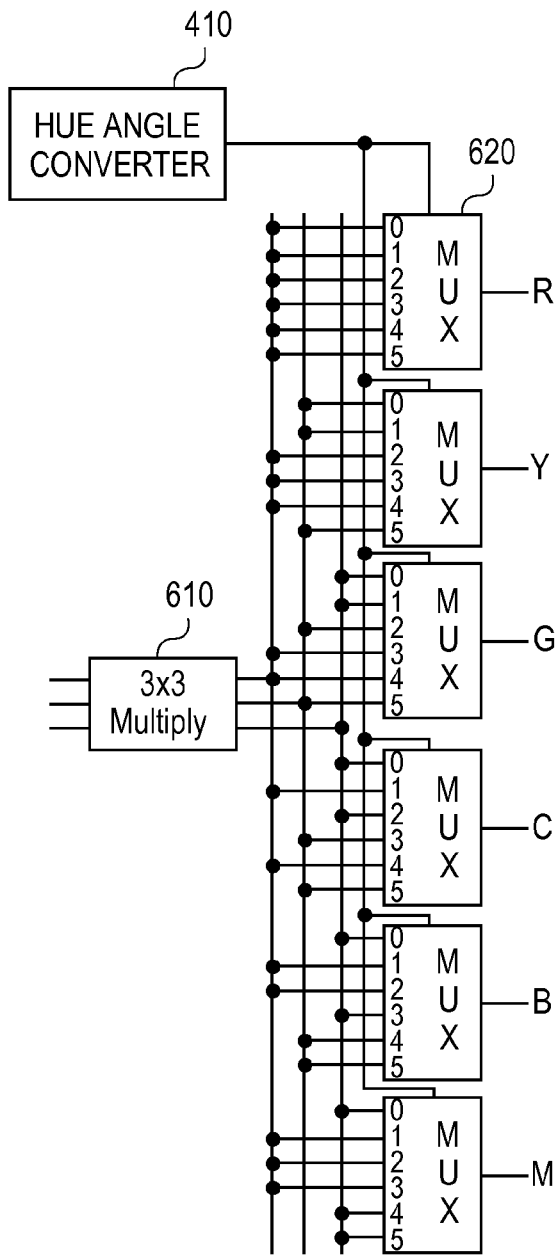
FIG. 5
FIG. 6

METHOD AND APPARATUS FOR CONVERTING FROM A SOURCE COLOR SPACE TO A TARGET COLOR SPACE

RELATED APPLICATIONS

The present application is related to commonly owned United States Patent Applications: (1) U.S. patent application Ser. No. 10/691,200 entitled "HUE ANGLE CALCULATION SYSTEM AND METHODS" filed Oct. 21, 2003 and now issued as U.S. Pat. No. 6,980,219 B2; (2) U.S. patent application Ser. No. 10/691,377 entitled "METHOD AND APPARATUS FOR CONVERTING FROM SOURCE COLOR SPACE TO RGBW TARGET COLOR SPACE"; filed Oct. 21, 2003 and published as United States Patent Application Publication 2005/0083341; and (3) U.S. patent application Ser. No. 10/690,716 entitled "GAMUT CONVERSION SYSTEM AND METHODS", filed Oct. 21, 2003 and published as United States Patent Application Publication 2005/0083344, which are hereby incorporated herein by reference.

In commonly owned United States Patent Applications: (1) U.S. patent application Ser. No. 09/916,232 ("the '232 application"), entitled "ARRANGEMENT OF COLOR PIXELS FOR FULL COLOR IMAGING DEVICES WITH SIMPLIFIED ADDRESSING," filed Jul. 25, 2001, now issued as U.S. Pat. No. 6,903,754; (2) U.S. patent application Ser. No. 10/278,353 ("the '353 application"), entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002, and published as United States Patent Application Publication No. 2003/0128225; (3) U.S. patent application Ser. No. 10/278,352 ("the '352 application"), entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS," filed Oct. 22, 2002, and published as United States Patent Application Publication No. 2003/0128179; (4) U.S. patent application Ser. No. 10/243,094 ("the '094 application), entitled "IMPROVED FOUR COLOR ARRANGEMENTS AND EMITTERS FOR SUB-PIXEL RENDERING," filed Sep. 13, 2002, and published as United States Patent Application Publication No. 2004/0051724; (5) U.S. patent application Ser. No. 10/278,328 ("the '328 application"), entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002, and published as United States Patent Application Publication No. 2003/0117423; (6) U.S. patent application Ser. No. 10/278,393 ("the '393 application"), entitled "COLOR DISPLAY HAVING HORIZONTAL SUB-PIXEL ARRANGEMENTS AND LAYOUTS," filed Oct. 22, 2002, and published as United States Patent Application Publication No. 2003/0090581; and (7) U.S. patent application Ser. No. 10/347,001 ("the '001 application") entitled "IMPROVED SUB-PIXEL ARRANGEMENTS FOR STRIPED DISPLAYS AND METHODS AND SYSTEMS FOR SUB-PIXEL RENDERING SAME," filed Jan. 16, 2003, and published as United States Patent Application Publication No. 2004/0080479, novel sub-pixel arrangements are therein disclosed for improving the cost/performance curves for image display devices and which are herein incorporated by reference.

For certain subpixel repeating groups having an even number of subpixels in a horizontal direction, the following systems and techniques to affect proper dot inversion schemes are disclosed and these applications are herein incorporated by reference: (1) U.S. patent application Ser. No. 10/456,839 entitled "IMAGE DEGRADATION CORRECTION IN NOVEL LIQUID CRYSTAL DISPLAYS" and published as United States Patent Application Publication No. 2004/0246280; (2) U.S. patent application Ser. No. 10/455,925 entitled "DISPLAY PANEL HAVING CROSSOVER CONNECTIONS EFFECTING DOT INVERSION" and published as United States Patent Application Publication No. 2004/0246213; (3) U.S. patent application Ser. No. 10/455,931 entitled "SYSTEM AND METHOD OF PERFORMING DOT INVERSION WITH STANDARD DRIVERS AND BACKPLANE ON NOVEL DISPLAY PANEL LAYOUTS" and published as United States Patent Application Publication No. 2004/0246381; (4) U.S. patent application Ser. No. 10/455,927 entitled "SYSTEM AND METHOD FOR COMPENSATING FOR VISUAL EFFECTS UPON PANELS HAVING FIXED PATTERN NOISE WITH REDUCED QUANTIZATION ERROR" and published as United States Patent Application Publication No. 2004/0246278; (5) U.S. patent application Ser. No. 10/456,806 entitled "DOT INVERSION ON NOVEL DISPLAY PANEL LAYOUTS WITH EXTRA DRIVERS" and published as United States Patent Application Publication No. 2004/0246279; and (6) U.S. patent application Ser. No. 10/456,838 entitled "LIQUID CRYSTAL DISPLAY BACKPLANE LAYOUTS AND ADDRESSING FOR NON-STANDARD SUBPIXEL ARRANGEMENTS" and published as United States Patent Application Publication No. 2004/0246404.

These improvements are particularly pronounced when coupled with sub-pixel rendering (SPR) systems and methods further disclosed in those applications and in commonly owned United States Patent Applications and patents: (1) U.S. patent application Ser. No. 10/051,612 ("the '612 application"), entitled "CONVERSION OF RGB PIXEL FORMAT DATA TO PENTILE MATRIX SUB-PIXEL DATA FORMAT," filed Jan. 16, 2002, which is published as United States Patent Application Publication No. 2003/0034992, and is now issued as U.S. Pat. No. 7,123,277; (2) U.S. patent application Ser. No. 10/150,355 ("the '355 application"), entitled "METHODS AND SYSTEMS FOR SUB-PIXEL RENDERING WITH GAMMA ADJUSTMENT," filed May 17, 2002, and published as United States Patent Application Publication No. 2003/0103058; (3) U.S. patent application Ser. No. 10/215,843 ("the '843 application"), entitled "METHODS AND SYSTEMS FOR SUB-PIXEL RENDERING WITH ADAPTIVE FILTERING," filed Aug. 8, 2002 and published as United States Patent Application Publication No. 2003/0085906; (4) U.S. patent application Ser. No. 10/379,767 entitled "SYSTEMS AND METHODS FOR TEMPORAL SUB-PIXEL RENDERING OF IMAGE DATA" filed Mar. 4, 2003 and published as United States Patent Application Publication No. 2004/0196302; (5) U.S. patent application Ser. No. 10/379,765 entitled "SYSTEMS AND METHODS FOR MOTION ADAPTIVE FILTERING," filed Mar. 4, 2003 and published as United States Patent Application Publication No. 2004/0174380; (6) U.S. patent application Ser. No. 10/379,766 entitled "SUB-PIXEL RENDERING SYSTEM AND METHOD FOR IMPROVED DISPLAY VIEWING ANGLES" filed Mar. 4, 2003 and no issued as U.S. Pat. No. 6,917,368; and (7) U.S. patent application Ser. No. 10/409,413 entitled "IMAGE DATA SET WITH EMBEDDED PRE-SUBPIXEL RENDERED IMAGE" filed Apr. 7, 2003 and published as United States Patent Application Publication No. 2004/0196297, which are hereby incorporated herein by reference.

BRIEF DESCRIPTION OF THE DRAWINGS

The accompanying drawings, which are incorporated in, and constitute a part of this specification illustrate exemplary implementations and embodiments of the invention and, together with the description, serve to explain principles of the invention.

FIGS. 5 and 6 depict one embodiment of a hardware optimization for implementing an efficient 3×N multiply unit in a multi-primary conversion system.

DETAILED DESCRIPTION

Reference will now be made in detail to implementations and embodiments, examples of which are illustrated in the accompanying drawings. Wherever possible, the same reference numbers will be used throughout the drawings to refer to the same or like parts.

Most monitors and TVs today were designed to display three-valued color data such as RGB and sRGB (sometimes called non-linear RGB or R'G'B') or three-valued chroma/luminance signals such as YIQ or YCbCr. To make brighter displays and displays with larger color gamuts, manufacturers are starting to consider multi-primary displays. These displays will have more than three primary colors. However, there are no convenient sources of multi-primary image data, and there are a large number of sources of three-valued color data that should be converted to the new multi-primary displays. A method and apparatus is provided to convert existing three valued color data into multi-primary data for this new class of displays. The present method and apparatus will work for multi-primary displays with any number of color primaries.

Figure 1:
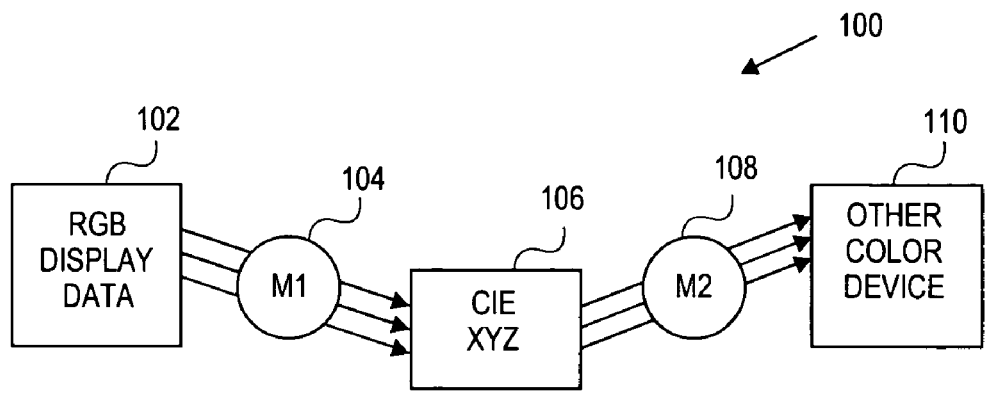
FIG. 1 shows one embodiment of a general color conversion diagram.

One conventional color conversion system 100 is depicted in FIG. 1. This approach treats RGB image data conversion—as a mapping from one color-space to another. This is commonly done between color output devices, for example converting RGB data intended for a monitor to a form that can be printed on a color printer. The traditional way to do this is to convert a source color image data 102 to CIE XYZ 106, then to convert that to the target color, for perhaps, another color device 110, as in FIG. 1. There are standard formulas, or conversion matrices (M1 104 and M2 108), to convert common color-spaces, such as RGB, into CIE XYZ and back again. For each output device, a different matrix can convert CIE XYZ for that particular device.

Figure 2:
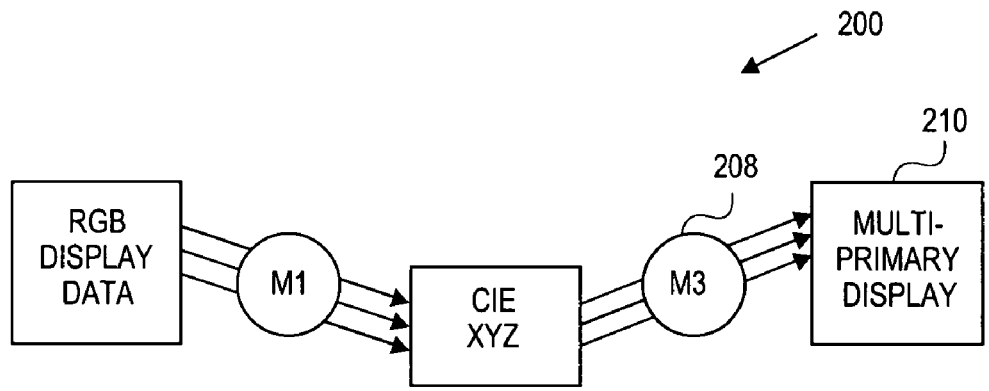
FIG. 2 shows another embodiment of a general color conversion diagram.
Figure 3:
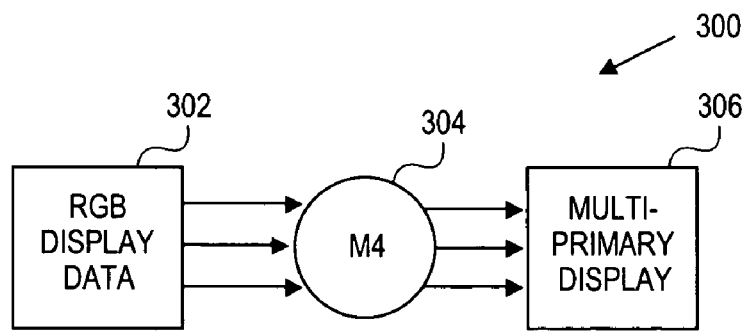
FIG. 3 shows yet another embodiment of a general color conversion diagram.

One embodiment 200 of the present system, as shown in FIG. 2, calculates a conversion matrix 208 for mapping CIE XYZ data 206 into multi-primary data for rendering on a multi-primary display 210 (i.e. a display having any number of colored subpixels greater than three colors). FIG. 3 depicts yet another embodiment 300. In this embodiment, the matrices for mapping RGB data 302 to CIE XYZ and then from CIE XYZ to multi-primary data for display 306 are combined into one matrix 304 that converts directly from RGB in one step.

Figure 4:
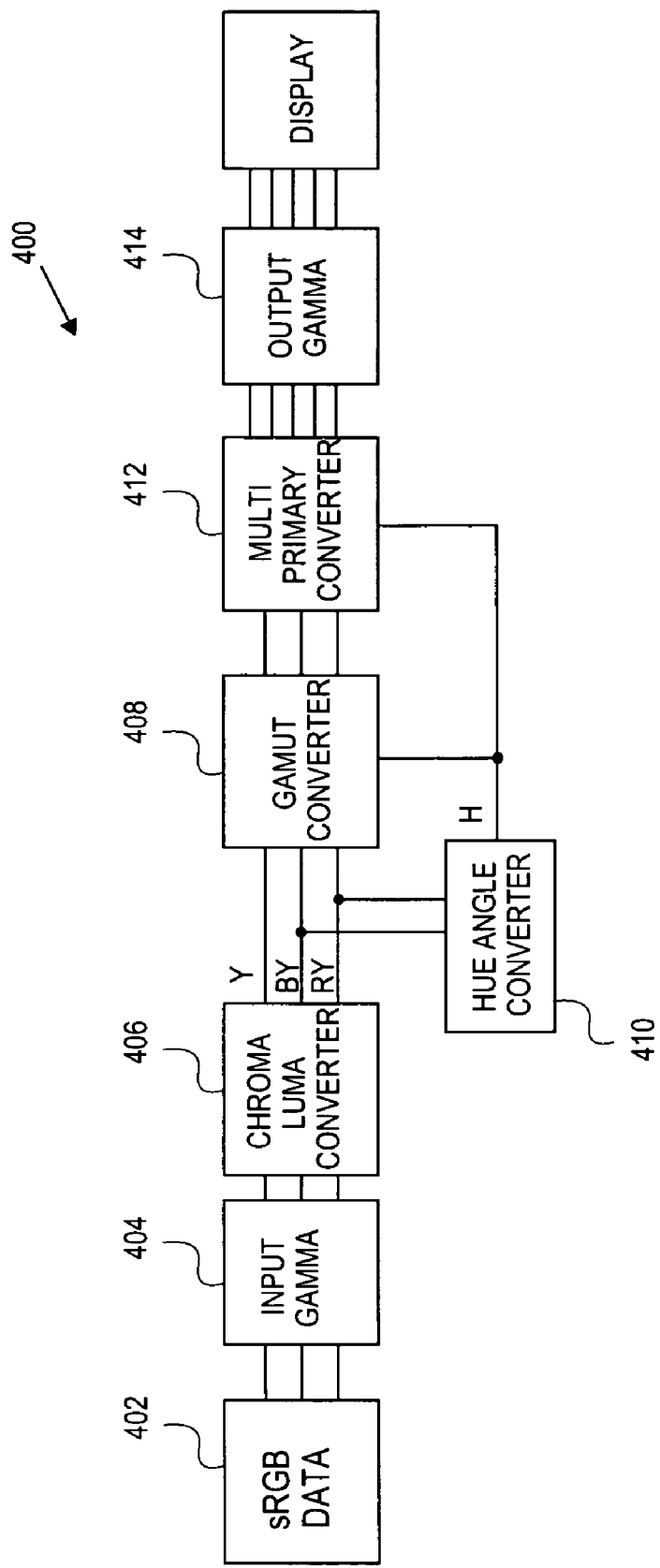
FIG. 4 depicts one embodiment of a gamut pipeline as made in accordance with the principles of the present invention.

Although the conversion from three-value to multi-primary is depicted as one mathematical step in FIG. 3, there may be other desirable steps and/or subsystems in other embodiments. FIG. 4 shows yet another embodiment of a "gamut pipeline" system 400. Thus, for example, in the conversion from three valued data (e.g. sRGB data, RGB, or the like at 402) to multi-primary, it may be desirable to perform one or more of the following steps and/or subsystems, such as an input gamma 404 and output gamma 414, a conversion from RGB to a color-space with separate chroma and luma 406, gamut conversion 408, hue angle converter 410, a multiprimary converter 412. In some embodiments, some of these steps may not be required or desired. For example, if the three-value color input is YCbCr instead of RGB, the conversion to separate chroma and luma is not desired. If the input data is sRGB, or RGB data with a nonlinear transform applied to it as in most images stored on computers, then the input gamma step is not desired. If the intermediate separate chroma/luma space used is CIE Lab, this space has an implied gamma and also includes the input gamma table. Thus, the general architecture of FIG. 4 is variable to allow a pass-by mode for optional subsystems—depending upon the requirements of any complete system incorporating the present invention. Alternatively, these optional subsystems could be deleted altogether—resembling a much simplified system, as shown in FIG. 3.

Chroma Luminance Converter

Many conventional video devices convert back and forth between RGB and separate chroma/luma color systems. In fact, such a converter is an off-the-shelf item that is readily available for use in hardware implementations. For the purposes of the present invention, such a conventional chroma/luma converter would suffice in the present system. However, in some cases, it may be desirable to design the algorithms and hardware in such a manner as to reduce costs of the design. Also, it may be desirable to calculate the chroma information as part of an intermediate step to calculate a hue angle, as will be discussed in greater detail below. Thus, the information needed may differ or be more easily computed with the present methods and system described herein.

In a first embodiment of a chroma/luma converter, Equation 1 shows a formula for a first conversion that has conversion constants which are all powers of two and thus easy to implement as shifts in hardware.

$$Y = R/4 + G/2 + B/4$$

$$By = B - Y$$

$$Ry = R - Y \qquad \text{Equation (1)}$$

In Equation 1, Y is the luminance component and By,Ry are the chrominance components. The formula for Y is similar to the standard conversion of RGB to luminance; except that red and blue colors are given equal luminance weight. For other applications, it may be possible in another embodiment to weight the chroma components differently. It may also be desirable to weight the chroma components in such a way as to simultaneously reduce the cost to implement the system. Equation 2 describes alternate weighted relationships that are also easy to implement in digital logic.

$$Y = (2*R + 4*G + G + B)/8$$

$$By = B - Y$$

$$Ry = R - Y \quad \text{Equation (2)}$$

In Equation 2, the green value is multiplied by ⅝ths by first multiplying by 4 then adding one more copy, then eventually divided by 8. If done in floating point, this formula would look like: Y=0.25*R+0.625*G+0.125*B. This compares favorably to the REC 709 conversion formula for luminosity: Y=0.2127*R+0.7152*G+0.0722*B. Using Equation 2 to convert RGB to chroma/luma is reasonably close for intermediate calculations but can be easily implemented with shifts and adds in hardware. Equation 2 thus gives a transformation from RGB space to a new color-space—YByRy.

Gamut Converter

Multi-primary displays are considered to produce a display that can render more of the colors visible to the human eye than previous, conventional 3-color displays. However, most of the computer images and TV programming that currently exists was created with the assumption of the reduced gamut of TVs and computer monitors. One of the assumptions of a gamut converter is that TV cameras, digital cameras, and other input devices do not destroy the expanded gamut of the real world, but compress much of it into the limited gamut that they can represent. Thus, it may be desirable to reconstruct the full gamut in image sources by stretching the gamut back out again. This optional gamut conversion block 408 of FIG. 4 is further disclosed in the copending application entitled "GAMUT CONVERSION SYSTEM AND METHODS" and incorporated herein by reference.

Multi-Primary Converter

Now it will be described a system and a method for generating the matrix for converting from one space (for example, CIE XYZ) to another space for rendering on a multi-primary display. Once such a matrix or mapping (e.g. CIE XYZ to multi-primary) is constructed, it may be combined with other conversion matrices to create a single matrix (for example, via matrix multiplication), so that a separate conversion to an intermediate space (e.g. CIE XYZ) is actually never performed. In one embodiment, if, in an earlier optional step, the input data is converted to YCbCr, there exists a standard matrix for converting this to RGB. There also exists a standard matrix for converting RGB to XYZ. These two matrices can be combined (i.e. multiplied) with the CIE XYZ to multi-primary matrix to create a single matrix that performs a direct conversion from YCbCr to multi-primary.

As is known, the CIE XYZ color space is versatile in that this color space can encode any color that is visible to a "standard observer" so it essentially encodes all the colors of human vision. Thus, if one has a way to convert any color on your input or output device into CIE XYZ and back, then you can convert to or from any other calibrated device. There are standard transformation matrices for converting from RGB to CIE XYZ and back again. These standard transformation matrices (also known as "recommendations" or "Rec") are based on the typical values of the primary colors and white point of a display device are often good enough for casual color conversions and calculations. Several of these standards are the "CIE Rec 601-1", "CIE Rec 709" or the "CIE XYZ itu". The white points for these recommendations have names like "D50" "D65" or "Illuminant E". Each recommendation has a slightly different chromaticity value for each of the red green and blue primary colors and a different white point value.

These standard recommendations are approximations and it is considered more accurate to measure the chromaticity values of the primary colors of a specific display model and calculate a transformation matrix tailored for that model of display. To do this, e.g., the chromaticity of each primary color and the CIE XYZ tri-stimulus values of the white point is typically measured. Chromaticity values are pairs of "little x" and "little y" values—$x_r, y_r$ for the red primary, $x_g, y_g$ for the green and $x_b, y_b$ for the blue. There is a "little z" value as well, but this can be calculated from the x and y values with the formula z=1−x−y. With just these four pieces of information (three primary chromaticity values and one XYZ white point), it is possible to calculate the transformation matrices as follows:

$$\begin{pmatrix} X \\ Y \\ Z \end{pmatrix} = \begin{pmatrix} x_r \cdot Cr & x_g \cdot Cg & x_b \cdot Cb \\ y_r \cdot Cr & y_g \cdot Cg & y_b \cdot Cb \\ z_r \cdot Cr & z_g \cdot Cg & z_b \cdot Cb \end{pmatrix} \cdot \begin{pmatrix} R \\ G \\ B \end{pmatrix} \quad \text{Equation (3)}$$

Equation 3 shows the formula for converting from RGB values to XYZ. The Cr, Cg and Cb values are linear weighting values that must be calculated for a particular family of displays. Given the white point XYZ values, (Xw Yw Zw) and knowing that this translates into RGB values of (1 1 1), equation 3 can be re-written into the following form:

$$\begin{pmatrix} X_W \\ Y_W \\ Z_W \end{pmatrix} = \begin{pmatrix} x_r & x_g & x_b \\ y_r & y_g & y_b \\ z_r & z_g & z_b \end{pmatrix} \cdot \begin{pmatrix} Cr \\ Cg \\ Cb \end{pmatrix} \quad \text{Equation (4)}$$

Equation 4 can be solved for (Cr Cg Cb) by inverting the matrix of chromaticity values and multiplying by the white point vector. The resulting Cr Cg and Cb values can then be substituted into Equation 3 creating a matrix that converts from RGB to XYZ. The inverse of that matrix can be used to convert from XYZ to RGB.

Now, in order to convert into a color space with more than three coordinates (i.e. multi-primary space), then additional processing is required. This is primarily because of the fact that Equations 3 and 4 have square matrices that can be inverted to calculate intermediate values and to calculate reverse transformation matrices. However, when there are non-square matrices involved, inverse operations are problematic. For example, the following matrices are depicted transforming RGBC (where "C" is cyan; but any other color may suffice; or, alternatively, any four colors C1, C2, C3, and C4 would suffice) space into XYZ space:

$$\begin{pmatrix} X \\ Y \\ Z \end{pmatrix} = \begin{pmatrix} x_r \cdot Cr & x_g \cdot Cg & x_b \cdot Cb & x_c \cdot Cc \\ y_r \cdot Cr & y_g \cdot Cg & y_b \cdot Cb & y_c \cdot Cc \\ z_r \cdot Cr & z_g \cdot Cg & z_b \cdot Cb & z_c \cdot Cc \end{pmatrix} \cdot \begin{pmatrix} R \\ G \\ B \\ C \end{pmatrix} \quad \text{Equation (5)}$$

$$\begin{pmatrix} X_W \\ Y_W \\ Z_W \end{pmatrix} = \begin{pmatrix} x_r & x_g & x_b & x_c \\ y_r & y_g & y_b & y_c \\ z_r & z_g & z_b & z_c \end{pmatrix} \cdot \begin{pmatrix} Cr \\ Cg \\ Cb \\ Cc \end{pmatrix} \quad \text{Equation (6)}$$

If we knew the values of (Cr Cg Cb Cc) we would be able to convert from (R G B C) to XYZ. However, in Equation 6, the matrix is no longer square and cannot be inverted. There are four unknowns and only three equations, not enough information to find a unique solution. In actual fact, there are many solutions and one such solution might suffice if found. There are many different numerical techniques in the literature for finding solutions like this. Just as an example, MathCad uses several of these techniques (linear, conjugate gradient, Levenberg-Marquardt or quasi-Newton) to find numerical solutions. Starting from an initial guess for the unknown values—for one example set Cr, Cg, Cb and Cc all equal to 1 (of course other initial values are sufficient)—these techniques search for better values until some condition is met. Equation 6 is a condition that could be used to do this search.

However, when Equation 6 is used as the search condition, the solutions most often found are ones that result in one of the Cr, Cg, Cb or Cc values going to zero. So, it is desirable to find conditions on the equations that would result in solutions other than trivial ones. One embodiment of such a transformation matrix that may avoid this problem is given below:

$$\begin{bmatrix} (X_W)^2 \\ (Y_W)^2 \\ (Z_W)^2 \end{bmatrix} = \begin{bmatrix} (x_r \cdot Cr + x_g \cdot Cg + x_b \cdot Cb + x_c \cdot Cc)^2 \\ (y_r \cdot Cr + y_g \cdot Cg + y_b \cdot Cb + y_c \cdot Cc)^2 \\ (z_r \cdot Cr + z_g \cdot Cg + z_b \cdot Cb + z_c \cdot Cc)^2 \end{bmatrix} \quad \text{Equation (7)}$$

Equation 7 results from taking Equation 6 and symbolically expanding the right side of the equation and squaring the components of both sides. With Equation 7, it should be possible to find results that do not involve one of the primaries going to zero. With Equations 7 and 6 together as conditions for the solution, it is possible to find yet another non-zero solution. There are possibly many (and perhaps an infinite number of) solutions but it suffices to find one of them for the purposes of the present invention. Of course, the present invention encompasses other conditions to find a non-trivial solution and the present invention should not be limited to the recitation of any one or few numbers of such conditions.

When we have actual displays—displays with different primaries or displays with more than four primaries—then either Equation 4 or 5 may fail to find a solution in some of these situations. In that case, it may be desirable to find another condition equation that allows the numerical search algorithm to find a useful solution.

The solution to Equation 6 is a set of Cr, Cg, Gb and Cc values that can be substituted into Equation 5, which can now convert any 4-primary (R G B C in this case) value into CIE XYZ. The above procedure was demonstrated with a 4-primary system, but this procedure works just as well with any number of primaries. Converting from multi-primary to CIE XYZ is a useful task but what is more useful would be to convert CIE XYZ value into (R G B C) or some other multi-primary system.

Converting CIE XYZ to Multi-Primary

The matrix in Equation 5 is not square so it cannot be inverted and the equation cannot be simply solved to convert from CIE XYZ. Of course, if the matrix could be inverted, the result would look similar to this:

$$\begin{pmatrix} R \\ G \\ B \\ C \end{pmatrix} = \begin{pmatrix} R1 & R2 & R3 \\ G1 & G2 & G3 \\ B1 & B2 & B3 \\ C1 & C2 & C3 \end{pmatrix} \cdot \begin{pmatrix} X \\ Y \\ Z \end{pmatrix} \quad \text{Equation (8)}$$

Although the solution cannot be solved for by inverting a matrix, it is possible to glean an inverse equation and it should be able to test to see if the transformation matrix is a correct one. One embodiment might be to convert all the primary colors to CIE XYZ using equation 5. In the case of a 4-primary system, we would then have five known input and output values (4 primaries plus the white point) and could use them as condition equations. However, this may be difficult because there may be too many restrictions on the system to find a linear solution. The analogous situation might be to find a single straight line through a collection of points. In the case of solving Equation 8, we are trying to find a linear equation, a plane that passes through all of our primary points and the white point in a 4 dimensional space. There will always be a plane that passed through three of these points, but if trying to find one through all the points may be difficult.

Figure 9:
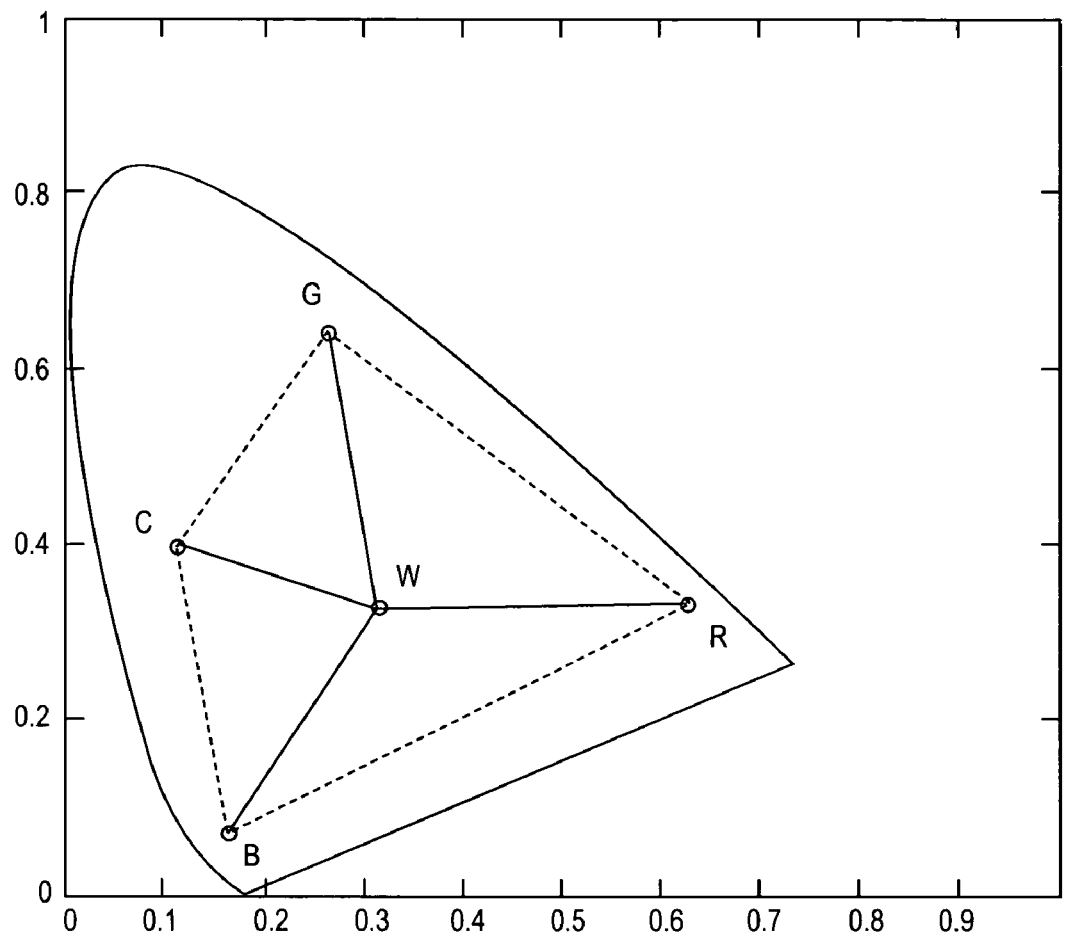
FIG. 9 depicts one embodiment of a chromaticity diagram for an example multi-primary system with 4 primaries, RGB and C where C is cyan.

However, given that there is always a solution to the case with three points, it is possible to formulate a general way to convert from CIE XYZ to any multi-primary system. It is possible to find a matrix for Equation 8 that works if the image data point is inside a chromaticity triangle—for example, between the red, green and white point. Likewise, a matrix for Equation 8 may be found that works for a point is inside the chromaticity triangle between the green, cyan, and white point, etc., e.g., as shown in FIG. 9. In general, no matter how many primaries a system has, it should be possible to break the color space down into regions (for example, triangles or some other shapes) that are bounded by the white point and two primaries. Additionally, it may not be required that the regions are disjoint—i.e. it may be possible to define solution matrices for regions that have overlapping color points. For each triangle or region, a matrix for Equation 8 should always be found that converts CIE XYZ to multi-primary inside that triangle or region.

In addition to the fact that the regions may be other than triangles for the purpose of the present invention, it is also possible to define another point—i.e. other than the white point—in which to calculate solution matrices. In fact, it may be desirable to choose other points that are off-white to in which to calculate solutions—possibly in regards to backlighting conditions. Of course, for purposes of the present invention, any other point in the interior of the target color space might suffice for suitable solutions matrices for converting to a multi-primary color space.

For yet another embodiment, it is possible that the source color space has N primaries and the target color space has N+1 or more primaries—such that there is less than N primaries in common between the source and the target color spaces (with the extreme case being that there are no primaries in common between the source and the target color spaces). Having primaries in common is not a requirement of this invention, since the intermediate colorspace of CIE XYZ is used. For example, monitors are typically RGB while printers are typically CMY and yet conversions between the two are routinely done. In the case of N source primaries and N+1 or more target primaries, the method for generating conversion equations proceeds as described above. Because there may not be standard recommended conversion equations for the source color space, the procedure may have to be done twice, once to generate conversion equations to convert the source space to CIE XYZ and a second time to generate conversion equations to convert CIE XYZ to the target color space. Then the resulting matrices can be combined together to do the conversion directly without going through the intermediate CIE space.

For each triangle, the CIE XYZ tristimulus values of each corner can be calculated using equation 5 above. These three known points can then be used as test conditions in a numerical solver for finding a matrix for Equation 8. On the lines between the triangles, the matrix for the triangle on either side can be used since this line segment is a locus where both transformations are restricted to produce the same results. Each of these matrices will have rows that are unique and rows that repeat (where repeating rows may appear anywhere). Table 1 shows the exemplary matrix for the red-green-white triangle in RGBC color space.

TABLE 1

| 2.166792 | −0.850238 | −0.192135 |
|---|---|---|
| −1.778663 | 3.483939 | −0.728554 |
| 0.024661 | −0.175291 | 1.057744 |
| 0.024661 | −0.175291 | 1.057744 |

TABLE 2

| 4.962725 | −4.231465 | 0.47251 |
|---|---|---|
| −4.849038 | 9.749895 | −3.802703 |
| −0.04661 | 0.003508 | 0.955759 |
| −0.04661 | 0.003508 | 0.955759 |
| −0.04661 | 0.003508 | 0.955759 |
| −0.04661 | 0.003508 | 0.955759 |
| −0.04661 | 0.003508 | 0.955759 |

In this Table 1, it should be noted that the rows that are not related to the primary corners of the associated triangle are identical. This will generally be true of any matrix generated this way for any primary system. Table 2 shows this in an extreme case (e.g. RYW triangle in R,Y,G,T,C,B,M—where T is turquoise and M is magenta) that has 7 primaries. The identical rows in Table 3 refer to "outside of the triangle" primaries (i.e. not R and not Y) that are restricted to linearly change from 0 to 1 from the outside edge to the white point. Knowing that many of the values in these matrices will be identical can lead to optimizations in the hardware implementation. The storage for the matrix in Table 2 could be reduced, for example. Also the calculation of the multi-primary values could be simplified by knowing that many of the multiplications are done with the same constant values. This will be discussed below as 3×N multiplier hardware optimization.

To convert a CIE XYZ value to multi-primary, it is desirable to determine which chromaticity triangle the color is in and use the corresponding matrix to do the conversion in Equation 8. The XYZ values can be converted to xyY chromaticity and then tested against the original chromaticity co-ordinates. Although this works well, it could be computationally very expensive to do at full speed in a monitor. In another embodiment, there is a single 3×3 matrix multiply that could determine if a point is in a triangle. This is also computationally intensive, but may be reasonable in some architectures where this is a common operation. Graphics adapter cards for PC computers often have this capability as part of their texture mapping capability. The input color values can be converted to some hue based color co-ordinate system and then the hue angle could be used to determine which triangle the color is in. The hue angle is something that may be calculated for other reasons, for example it is important to many gamut expansion algorithms. So this information may already be available and could be used to choose the transformation matrix with little or no increase in computational complexity.

Hue Angle Calculator

When doing multi-primary conversion as described above, it was desirable to calculate the hue angle and use it as an index to select a conversion matrix. One improved embodiment of a hue angle calculator comes from changing the number of degrees around a circle from 360 to a power of 2—e.g. 256. Units of angle having only 256 "degrees" around a circle is easier to implement in hardware. This and other embodiments are disclosed in one of the co-pending, related applications mentioned above.

RGBW Special Case

RGBW is a display with 4 primaries where three of them are the usual red, green and blue but the fourth primary is pure white. This type of display is of interest because the addition of white can increase the brightness. One of the "primaries" is white and lies underneath the white-point. Despite this situation, it is still possible to build a set of multi-primary matrices to convert CIE XYX to RGBW. This is disclosed in yet another co-pending, related application mentioned above.

3×N Multiplier Hardware Optimization

As mentioned in connection with Tables 1 and 2 above, FIG. 5 shows one way of reducing the memory required to store the 3×N matrices—in this case, a six primary system. It was also mentioned above that there would be a way to take advantage of the identical rows in the hardware. FIG. 6 shows how this can be done with a 3×3 multiplier and 6 multiplexors for the same 6-primary system. This is just one example, the same savings can be done with any number of primaries. As the number of primaries increases, the number of inexpensive multiplexors increases, but the number of expensive multipliers remains constant at 3×3.

As mentioned in connection with Tables 1 and 2 above, FIG. 5 shows one way of reducing the memory required to store the 3.times.N matrices—in this case, a six primary system. It was also mentioned above that there would be a way to take advantage of the identical rows in the hardware. FIG. 6 shows how this can be done with a single 3.times.3 multiplier and 6 multiplexors for the same 6-primary system. This is just one example, the same savings can be done with any number of primaries. As the number of primaries increases, the number of inexpensive multiplexors increases, but the number of expensive multipliers remains constant at a single 3.times.3 multiplier.

FIG. 6 shows how to use the 3×3 matrices from FIG. 5 to perform multi-primary conversions. Three valued colors are presented to 3×3 matrix multiplier 610 and one of the 6 matrices shown in FIG. 5 is chosen based on the triangle number of the input color, calculated using Hue Angle Converter 410 (FIG. 4) as described in a related application regarding hue angle calculations. 3×3 matrix multiplier 610 performs the 9 multiplies (and several additions to complete a matrix multiply) and outputs 3 values. These three values are distributed as the 6 output signals by 6 multiplexors. The multiplexors also use the chromaticity triangle number produced by Hue Angle Converter 410 as their input to select different values. The three multiply results are wired to the 6 multiplexors depending upon the rules used to compact the original multi-primary matrices into 3×3 matrices. For example, the rule that the red row is always put in the top row of the 3×3 matrices means that red multiplexor 620 always selects the first matrix multiplier result. Thus, red multiplexor 620 is somewhat unnecessary, but it is left in as an example. It should be appreciated that the same hardware optimization can be applied to an N primary system where N is typical greater than 3.

Figure 7:
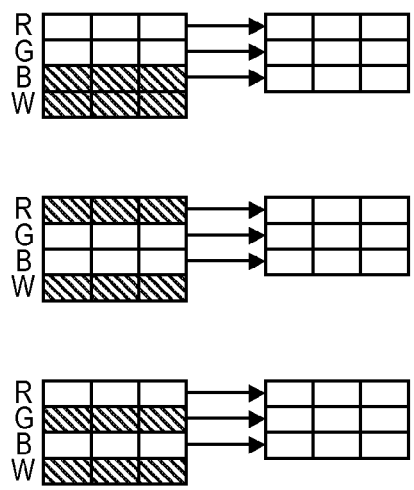
FIGS. 7 and 8 show yet another embodiment of a hardware optimization for an efficient multiplier for a RGBW system.
Figure 8:
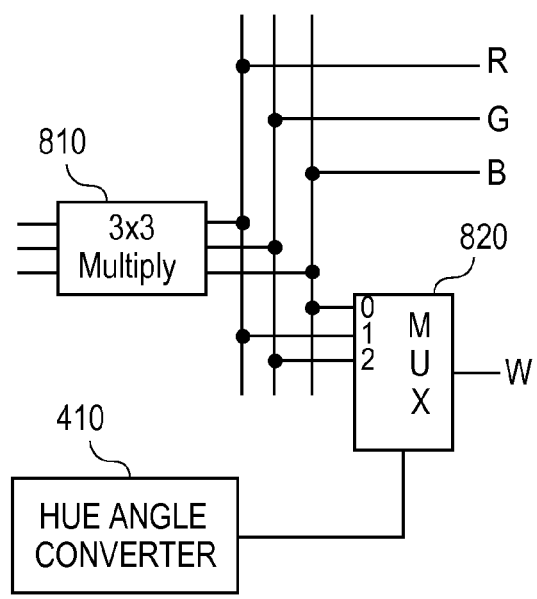

FIG. 7 shows the special case for RGBW when W (white) is one of the primaries. The W row of coefficients in each matrix of FIG. 7 typically contains a row identical to one of the other rows in the matrix, with the identical rows shown shaded in the matrices on the left side of FIG. 7. The W row, therefore, can be removed from each of the original matrices to form the 3×3 matrices. Also in the case of RGBW, only 3 rows remain after removing the W row of coefficients, and these three rows can be kept in their original order. Because of this, the multiplexors for R G and B are not required in the RGBW implementation, as shown in FIG. 8. Only one multiplexor 820 for W may be desirable to choose the correct value from the other primaries.

In the above embodiments, reference to functional blocks can be implemented using any combination of hardware and/or software, including components or modules such as one or more memory devices or circuitry. For example, a programmable gate array or like circuitry can be configured to implement such functional blocks. In other examples, a microprocessor operating a program in memory can also implement such functional blocks.

While the here disclosed aspects of invention have been described with reference to exemplary embodiments thereof, it will be understood by those skilled in the art after reading this disclosure that various changes may be made and equivalents may be substituted for elements described herein without departing from the spirit and scope of the disclosure. In addition, many modifications may be made to adapt a particular situation or material to the teachings without departing from the spirit and scope thereof. Therefore, it is intended that the disclosure not be limited to the particular embodiments detailed herein but that the disclosure be seen as including other embodiments as well.

What is claimed is:

1. A machine-implemented method that defines an image displayed by a display device having M color sources each respectively outputting a respective one of M unique primary colors, where the display device thereby has a displayable color space that is definable as a polygon disposed within a rectangular gamut space where the displayable color space has M>N primary color points defining vertices of the polygon such that substantially any color point on linear boundaries of the polygon or in an interior of the polygon can be displayed by the M color sources of the display device, where M and N are each a whole number greater than 2 and N defines primary colors of a source color space from which sourced color points are to be rendered by use of the M>N color sources of the display device, said machine-implemented method converting the sourced color points into target color data signals that define said image displayed by the display device and said method comprising:

(a) first identifying for each sourced color point, a corresponding one of a plurality of hypothetical triangular regions as the region inside of which, or on whose boundaries the sourced color point lies, where said hypothetical triangular regions populate the displayable color space polygon and each of the hypothetical regions has a first vertex at a predefined and common interior point inside the polygon and each hypothetical region respectively has two spaced apart points on the boundary of the polygon as respective second and third vertices of the triangular region;

(b) in response to said first identifying, second identifying a corresponding one of a prespecified plurality of conversion matrices that respectively correspond to the plurality of hypothetical regions, where the identified conversion matrix corresponds to the first identified hypothetical triangular region; and (c) using the identified conversion matrix to convert the sourced color point into a corresponding target color data signal that defines said image displayed by the display device.

2. The machine-implemented method of claim 1 wherein said hypothetical triangular regions do not overlap with one another.

3. The machine-implemented method of claim 1 wherein said respective second and third vertices of the respective hypothetical triangular regions are defined by vertices of the polygon.

4. The method of claim 1 wherein said machine-implemented first identifying step (a) includes:
determining a hue angle for each sourced color point and using the determined hue angle to identify the corresponding one of the plurality of hypothetical triangular regions.

5. The method of claim 4 wherein said machine-implemented second identifying step (b) includes:
coupling a hue indicating signal to selection terminals of a plurality of multiplexers where selective inputs of the multiplexers receive input signals representing different conversion matrices applied to the sourced color points.

6. The method of claim 1 wherein said common interior point is the white point of the displayable color space.

7. The method of claim 1 wherein said common interior point is an off-white color point of the of the displayable color space.

8. The method of claim 1 wherein said M unique primary colors include a red, a blue, a green, and a cyan.

9. A display system comprising:

(a) a display having M unique color sources each respectively outputting a respective one of M unique primary colors, where the display thereby has a displayable color space that is definable as a polygon disposed within a rectangular gamut space where the displayable color space has M>N primary color points defining vertices of the polygon such that substantially any color point on linear boundaries of the polygon or in an interior of the polygon can be displayed by the M color sources of the display, where M and N are each a whole number greater than 2 and N defines primary colors of a source color space from which first sourced color points are to be rendered by use of the M>N color sources of the display device;

(b) a first identifier which identifies each of the first sourced color point as corresponding to one of a plurality of hypothetical radial regions by virtue of the first sourced color point being inside the radial region or on a boundary of the radial region, where said hypothetical radial regions populate the displayable color space polygon and each of the hypothetical radial regions has a first boundary point defining a vertex of the radial region, the first boundary point being disposed at a predefined and common interior point inside the polygon from which the radial region radially expands outwardly at least to the boundary of the polygon and where each hypothetical radial region respectively has two spaced apart boundary points disposed on the boundary of the polygon;

(c) a second identifier which is responsive to the first identifier and identifies a corresponding one of a prespecified plurality of conversion matrices that respectively correspond to the plurality of hypothetical radial regions, where the identified conversion matrix corresponds to the hypothetical radial region identified by the first identifier; and (d) a signal converter which uses the identified conversion matrix to convert each first sourced color point into a corresponding target color data signal.

10. The display system of claim 9 wherein said hypothetical radial regions do not overlap with one another.

11. The display system of claim 9 wherein said respective second and third boundary points of the respective hypothetical radial region are defined by vertices of the polygon.

12. The display system of claim 9 wherein each radial region is a triangle, wherein said respective second and third boundary points of the respective hypothetical radial region define vertices of the triangle.

13. The display system of claim 9 wherein said first identifier includes:

a hue converter that determines a hue angle for each first sourced color point and outputs a hue index signal representing the determined hue angle.

14. The display system of claim 13 wherein said hue index signal represents a full rotation around the hue circle as a binary coded index value.

15. The display system of claim 13 wherein said second identifier includes:

a plurality of multiplexers each having plural input terminals and an input selection port, where said hue index signal is coupled to the to input selection ports of the plural multiplexers and where the selectable input terminals of the multiplexers receive input signals representing different conversion matrices applied to the first sourced color points.

16. The display system of claim 9 wherein said common interior point is the white point of the displayable color space.

17. The display system of claim 9 wherein said common interior point is an off white point of the displayable color space.

18. The display system of claim 17 wherein said M unique primary colors include white.

19. The display system of claim 9 wherein said M unique primary colors include cyan.

20. The display system of claim 9 wherein said signal converter includes a matrix multiplier and a storage storing matrix coefficients of the prespecified plurality of conversion matrices.

21. The display system of claim 20 wherein said matrix multiplier is a 3 by 3 matrix multiplier.

22. The display system of claim 9 wherein said first sourced color points are defined by coordinate signals specifying coordinates in CIE XYZ space.

23. The display system of claim 22 and further comprising:

(e) a gamut converter that produces the first sourced color points from supplied second sourced color points where the supplied second sourced color points are defined by an N primaries color space.

\* \* \* \* \*

UNITED STATES PATENT AND TRADEMARK OFFICE
CERTIFICATE OF CORRECTION

PATENT NO. : 7,598,961 B2  Page 1 of 1
APPLICATION NO. : 10/691396
DATED : October 6, 2009
INVENTOR(S) : Michael Francis Higgins It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1028 days.

Signed and Sealed this

Twenty-eighth Day of September, 2010

David J. Kappos
*Director of the United States Patent and Trademark Office*